Patented Sept. 8, 1936

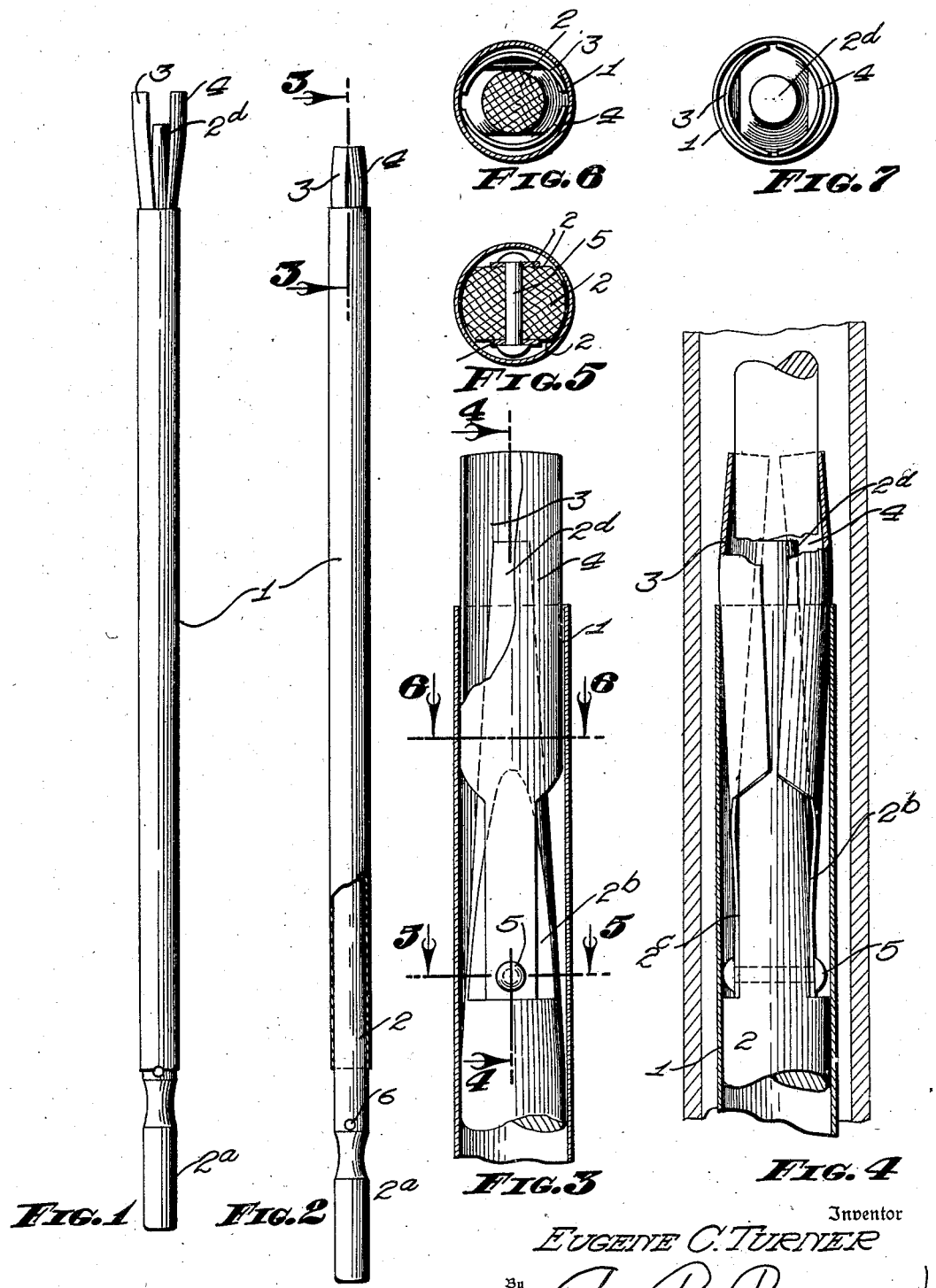

2,053,980

UNITED STATES PATENT OFFICE 2,053,980

BROKEN AUTOMOBILE AXLE PULLER

Eugene C. Turner, San Diego, Calif.

Application December 6, 1933, Serial No. 701,159

4 Claims. (Cl. 294—100)

My invention relates to a broken automobile axle puller, and the objects of my invention are:

First, to provide a device which may be inserted in the axle housing in open form over the end of a broken axle and clamped on to the end of the axle for pulling the axle from the housing;

Second, to provide a device of this class which is easily inserted into the housing and the clamping portion operated from the outer end;

Third, to provide a device of this class which provides a member for rigidly clamping the member with but slight effort on the part of the operator from the outside;

Fourth, to provide a device of this class which may be easily and quickly applied to the end of the axle in the housing;

Fifth, to provide a device of this class which will provide sufficient clamping pressure to provide the removal of axles without difficulty, and Sixth, to provide a device of this class which is very simple and economical of construction, easy to operate, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of the puller complete shown in its open position ready to be inserted into the axle housing for receiving the end of a broken axle; Fig. 2 is a similar view with the member in closed position and showing a portion of the casing broken away and in section to facilitate the illustration; Fig. 3 is an enlarged longitudinal sectional view along the line 3—3 of Fig. 2; Fig. 4 is a sectional view through 4—4 of Fig. 3 and showing in addition thereto a fragmentary portion of an axle clamped and showing the whole mounted in a fragmentary portion of an axle housing; Fig. 5 is a sectional view through 5—5 of Fig. 3; Fig. 6 is a sectional view through 6—6 of Fig. 3, and Fig. 7 is an end view on an enlarged scale of Fig. 2.

Similar characters of reference refer to similar parts and portions throughout the several views of the drawing.

The casing member 1, handle member 2, clamp members 3 and 4, rivet 5 and stop member 6 constitute the principal parts and portions of my broken automobile axle puller.

The casing 1 is a thin steel tubular member of suitable length to reach into various axles a required depth and is slightly smaller in diameter than the interior of the axle housing. This tubing is approximately two feet six inches long. Mounted in this casing 1 is a handle member 2 which is slightly smaller in diameter so that it will move longitudinally in the casing 1 and is provided with a hand hold portion 2a extending from the one end and is provided with a stop 6 at one end extending therefrom adapted to engage the end of the casing 1 to prevent the handle going in too far. This member 2 is provided with reduced cut away portions 2b and 2c on which are secured the clamp members 3 and 4 which are secured at their one ends to the reduced end of the member 2 by means of a rivet 5 so that the members 3 and 4 gradually taper outwardly and are made of spring metal and so formed that they tend to spring outwardly, as shown in Fig. 1 of the drawing, when the handle member 2 is in so that the stop 6 engages the end of the casing 1. The extended ends of these clamp members 3 and 4 are then tapered inwardly, as shown best in Figs. 2 and 4 of the drawing, the largest diameter being just outside of the end of the casing member 1 when the handle is withdrawn for clamping, as shown in Figs. 2 and 4 of the drawing. The extended end of the member 2 is tapered at 2d and extends to past the large portion of the members 3 and 4.

In operation the puller is inserted into the axle housing in open position, as shown in Fig. 1 of the drawing, until the end 2d engages the end of the axle, then the casing 1 is held and the handle 2 withdrawn, whereupon the clamping members 3 and 4 engage the outer surface of the axle some distance from its end; at the same time the handle is turned slightly causing the ends of the members 3 and 4 to gouge into the axle permitting a better grip of the members 3 and 4 on the axle, then the whole is withdrawn bringing the axle with it.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A broken automobile axle puller consisting of, a long tubular one-piece casing of uniform shape and size throughout its full length, a single piece handle member slidably mounted therein with an integral handle portion on one end extending beyond the end of said tube and an integral reduced tapering portion at the other end extending from the end of said tube, and a plurality of inherently resilient clamp members secured to the sides of said reduced portion and extending past the extended end of said reduced portion a short distance whereby the end of said reduced portion forms a feeler and stop in placing the puller on the end of a broken axle.

2. A broken automobile axle puller consisting of, a long tubular one-piece casing of uniform shape and size throughout its full length, a single piece handle member slidably mounted therein with an integral handle portion on one end extending beyond the end of said tube and an integral reduced tapering portion at the other end extending from the end of said tube, and a plurality of inherently resilient clamp members secured to the sides of said reduced portion and extending past the extended end of said reduced portion a short distance, said clamp members tapering outwardly from their connection to said reduced portion, then inwardly toward their free ends past the end of said reduced portion whereby the end of said reduced portion forms a feeler and stop in placing the puller on the end of a broken axle.

3. A broken automobile axle puller consisting of, a long tubular one-piece casing of uniform shape and size throughout its full length, a single piece handle member slidably mounted therein with an integral handle portion on one end extending beyond the end of said tube and an integral reduced tapering portion at the other end extending from the end of said tube, a plurality of inherently resilient clamp members secured to the sides of said reduced portion and extending past the extended end of said reduced portion a short distance, said clamp members tapering outwardly from their connection to said reduced portion, then inwardly toward their free ends past the end of said reduced portion said clamp members being curved in transverse cross section near their extended ends, and stop means at the handle end of said handle member adapted to engage said tubular casing for controlling the movement of said handle in said casing.

4. A broken automobile axle puller consisting of, a relatively long tubular one-piece casing of uniform shape and size throughout its full length, a single piece handle member considerably longer than said tubular casing slidably mounted in said casing and its ends protruding beyond the opposite ends of said casing, the one end formed into an integral handle portion and the other end formed into a reduced tapered portion and provided with flattened sides near the junction of said reduced portion with the main portion of the handle, and a pair of clamp members with reduced portions rigidly secured to the opposite sides of said tapered portion at the flattened sides thereof, and provided with enlarged clamp members extending outwardly from their connections to the tapered portion then inwardly toward their free ends past the end of said tapered portion, said clamp members being curved in transverse cross section near their extended ends conforming substantially to the inner surface of the end of said tubular casing.

EUGENE C. TURNER.